US009527688B2

(12) United States Patent
Yamamoto et al.

(10) Patent No.: US 9,527,688 B2
(45) Date of Patent: Dec. 27, 2016

(54) BELT-DRIVE DEVICE AND IMAGE FORMING APPARATUS

(71) Applicant: Konica Minolta, Inc., Chiyoda-ku, Tokyo (JP)

(72) Inventors: Koji Yamamoto, Toyokawa (JP); Mamoru Fukaya, Nagoya (JP); Masataka Yagi, Okazaki (JP); Toru Hayase, Toyohashi (JP); Ryuta Akiyama, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/885,010

(22) Filed: Oct. 16, 2015

(65) Prior Publication Data

US 2016/0122130 A1 May 5, 2016

(30) Foreign Application Priority Data

Oct. 31, 2014 (JP) ................................ 2014-223278

(51) Int. Cl.
*B65G 39/16* (2006.01)
*B65H 5/06* (2006.01)
(Continued)

(52) U.S. Cl.
CPC ............ *B65H 5/062* (2013.01); *B41J 13/025* (2013.01); *B65H 5/025* (2013.01);
(Continued)

(58) Field of Classification Search
CPC ................................ B65G 39/16; B65G 43/02
(Continued)

(56) References Cited

U.S. PATENT DOCUMENTS 5,117,970 A * 6/1992 Gibbs .................... B65G 39/07 198/808
6,912,371 B2 * 6/2005 Sato ................... G03G 15/2053 198/840
(Continued)

FOREIGN PATENT DOCUMENTS

JP 8-119484 A 5/1996
JP 2003-323064 A 11/2003
(Continued)

OTHER PUBLICATIONS

Office Action (Notification of Reasons for Refusal) dated Oct. 25, 2016 issued by the Japanese Patent Office in corresponding Japanese Patent Application No. 2014-223278, and English language translation of Office Action (8 pages).

*Primary Examiner* — James R Bidwell
(74) *Attorney, Agent, or Firm* — Buchanan Ingersoll & Rooney PC

(57) ABSTRACT

A belt-drive device includes a roller, a belt, and a meandering prevention member. The roller is rotatable about an axis. The belt is wound on an outer circumferential surface of the roller. The meandering prevention member is attached to an end of the roller and abuts a side of the belt in the direction of the axis. The meandering prevention member is elastically deformable and has an annular shape. The meandering prevention member has an inner circumferential surface whose diameter is less than an outer diameter of the roller before the meandering prevention member is attached to the roller.

11 Claims, 11 Drawing Sheets

(51) Int. Cl.
*B41J 13/02* (2006.01)
*G03G 15/20* (2006.01)
*B65H 5/02* (2006.01)

(52) U.S. Cl.
CPC ..... *G03G 15/2017* (2013.01); *B65H 2404/25* (2013.01); *B65H 2404/255* (2013.01); *G03G 2215/00151* (2013.01)

(58) Field of Classification Search
USPC .................................... 198/806, 807, 810.03
See application file for complete search history.

(56) References Cited

U.S. PATENT DOCUMENTS

| | | | | |
|---|---|---|---|---|
| 7,058,345 | B2 * | 6/2006 | Abe | B65G 23/44 198/806 |
| 7,643,782 | B2 | 1/2010 | Ishii et al. | |
| 8,135,323 | B2 * | 3/2012 | Suzuki | G03G 15/2064 399/329 |
| 8,752,688 | B2 * | 6/2014 | Fehrenbach | B65H 27/00 138/165 |
| 2007/0223978 | A1 | 9/2007 | Ishii et al. | |

FOREIGN PATENT DOCUMENTS

| | | | |
|---|---|---|---|
| JP | 2005-031349 | A | 2/2005 |
| JP | 2006-143417 | A | 6/2006 |
| JP | 2007-079149 | A | 3/2007 |
| JP | 2009-133984 | A | 6/2009 |
| JP | 2012-155350 | A | 8/2012 |

* cited by examiner

BELT-DRIVE DEVICE AND IMAGE FORMING APPARATUS

This application is based on Japanese Patent Application No. 2014-223278 filed on Oct. 31, 2014, the content of which is incorporated herein by reference.

BACKGROUND OF THE INVENTION

1. Field of the Invention

The present invention relates to a belt-drive device including meandering prevention members for controlling the meandering of a belt wound on a roller in the direction of a rotational axis, as well as an image forming apparatus including the same.

2. Description of Related Art

Conventional belt-drive devices of this type are used in, for example, belt fusers included in image forming apparatuses, as described in Japanese Patent No. 4691425. Such a belt-drive device includes a heating roller on which a fusing belt is wound, and the heating roller is subjected to, for example, cutting work such that the outer diameter of the heating roller is smaller at each end than at the center, and therefore, the heating roller is stepped at each end portion. Moreover, the end surface of the stepped portion abuts on an end surface of a belt meandering prevention member. As a result, the fusing belt is prevented from becoming stuck in a gap between the inner circumferential surface of the belt meandering prevention member and the outer circumferential surface of the heating roller, which might be caused due to dimensional error, thermal expansion, etc., of the meandering prevention member.

In recent years, to meet energy saving demand, the fuser is required to have a heating roller with low heat capacity. To achieve the low heat capacity of the heating roller, it is effective to reduce the volume of the heating roller. More specifically, it is effective to reduce the outer diameter of the heating roller.

Furthermore, not only the fuser but also various other devices use the belt-drive device. In such devices also, rollers are desired to have small diameters.

SUMMARY OF THE INVENTION

A belt-drive device according to an embodiment of the present invention includes a roller rotatable about an axis, a belt wound on an outer circumferential surface of the roller, and a meandering prevention member attached to an end of the roller and abutting a side of the belt in the direction of the axis. The meandering prevention member is elastically deformable and has an annular shape. The meandering prevention member has an inner circumferential surface whose diameter is less than an outer diameter of the roller before the meandering prevention member is attached to the roller.

An electrophotographic image forming apparatus includes a fuser provided with a belt-drive device according to an embodiment of the present invention.

DETAILED DESCRIPTION OF THE PREFERRED EMBODIMENTS

Hereinafter, belt-drive devices according to embodiments of the present invention, along with image forming apparatuses including the same, will be described with reference to the drawings.

Figure 1:
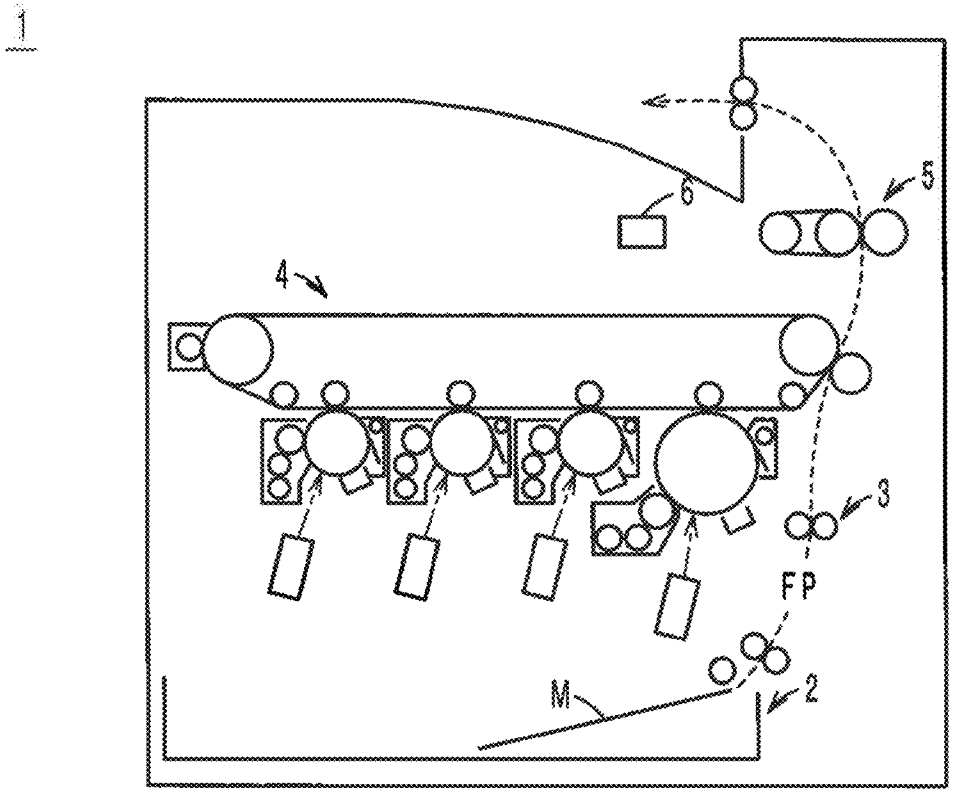
FIG. 1 is a view illustrating the overall configuration of an image forming apparatus.

Section 1: Overall Configuration and Print Operation of Image Forming Apparatus In FIG. 1, the image forming apparatus 1 is, for example, a copier, printer, or fax machine, or a multifunction machine provided with all or some of the functions, and is adapted to print an image on a sheet of print medium M (e.g., paper). To this end, the image forming apparatus 1 generally includes a paper feed unit 2, a resist roller pair 3, an image forming unit 4, a fuser 5, and a control unit 6. The operation of each element of the image forming apparatus 1 during a print operation will be described below.

The paper feed unit 2 has unprinted print media M stacked therein. The paper feed unit 2 feeds the print media M one by one to a feed path FP indicated by a dotted line in FIG. 1. The resist roller pair 3 is provided on the downstream side with respect to the paper feed unit 2 in the feed path FP. The resist roller pair 3 temporarily stops the print medium M fed from the paper feed unit 2, and thereafter, feeds the medium to a secondary transfer area at a predetermined time.

The image forming unit 4 generates toner images on an intermediate transfer belt using, for example, a tandem system with a well-known electrophotographic technology. The toner images are carried on the intermediate transfer belt toward the secondary transfer area.

Both the print medium M fed from the resist roller pair 3 and the toner images conveyed from the image forming unit 4 are delivered to the secondary transfer area. In the secondary transfer area, the toner images are transferred from the intermediate transfer belt onto the print medium M.

The print medium M is fed from the secondary transfer area and introduced into the fuser 5. The fuser 5 feeds the print medium M after fixing unfixed toner on the print medium M.

The control unit 6 has a CPU to execute a program stored in a ROM using a RAM as a work area. The control unit 6 performs a variety of types of control, including drive control of the fuser 5, which is essential in the present embodiment.

Section 2: General Configuration of Fuser

Figure 2:
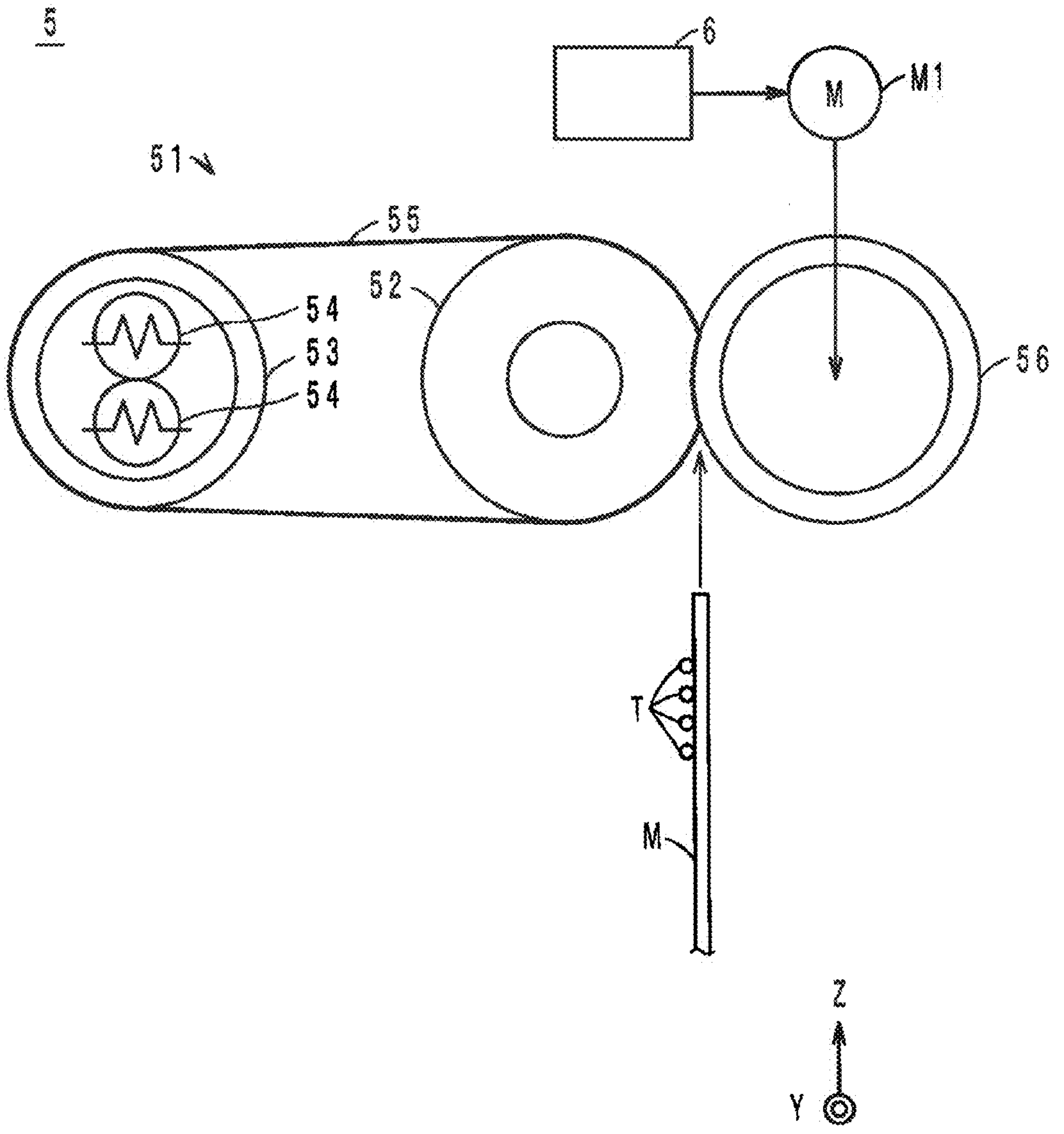
FIG. 2 is a diagram illustrating in detail the configuration of a fuser in FIG. 1.

In FIG. 2, the fuser 5 employs thermal belt fusing, and generally includes a fusing roller 52, a heating roller 53, preferably two heaters 54, a fusing belt 55, a pressure roller 56, and a motor M1. Here, at least the fusing roller 52, the heating roller 53, and the fusing belt 55 are components of a belt-drive device 51 as well.

The fusing roller 52 is in the form of a cylinder with a solid core. The core is made of, for example, a steel material such as SUM24. Note that SUM24 is defined by the Japanese Industrial Standards (JIS). The core has an outer diameter $\phi_{52}$ of, for example, 25 millimeters [mm]. Moreover, the core has a silicone rubber layer formed on its circumference surface, and the silicone rubber layer has a thickness $t_{52a}$, which is approximately constant almost across its entirety in the direction of the center axis of the fusing roller 52. In addition, the silicone rubber layer has a silicone sponge layer formed on its circumference surface, and the silicone sponge layer has a thickness $t_{52b}$, which is approximately constant almost across its entirety in the direction of the center axis. Each of the thicknesses $t_{52a}$ and $t_{52b}$ is, for example, about 2 mm.

The heating roller 53 has a hollow cylinder core. The core is made of a tubular material with high heat conductivity and low heat capacity (e.g., a steel pipe such as STKM), and preferably has a straight, stepless shape across its entirety in the direction of the center axis of the heating roller 53. Note that STKM also is defined by the JIS. Moreover, the core has an outer diameter $\phi_{53}$ of, for example, about 18 mm across its entirety in the direction of the center axis, and also has a thickness $t_{53}$ of about 0.3 mm. In addition, the heating roller 53 has an inner circumferential surface painted in, for example, black, and an outer circumferential surface coated with, for example, perfluoroalkoxy alkane (PFA).

The outer diameter $\phi_{53}$ and the thickness $t_{53}$ are as mentioned above. The outer diameter $\phi_{01}$ and the thickness $t_{01}$ of a conventional and typical heating roller are about 25 mm and about 0.5 mm, respectively, and therefore, the heating roller 53 is smaller in diameter and thickness than conventional. As is well-known, objects with lower heat capacity require less thermal energy when their temperatures rise. Here, the length of the heating roller 53 in the direction of the center axis is determined by the size of the print medium M, and therefore, is unrealistic to be changed. Accordingly, to reduce heat capacity and thereby achieve energy saving, it is preferable to reduce both the outer diameter $\phi_{53}$ and the thickness $t_{53}$ of the heating roller 53.

Each of the two heaters 54 is, for example, a straight halogen heater. Each heater 54 has an output power $P_{54}$ of about 1200 W. Moreover, one of the heaters 54 heats an area with a length $l_{54a}$. (referred to below as the "heating area length $l_{54a}$") of, for example, about 300 mm, and the other heater 54 heats an area with a length $l_{54b}$ (referred to below as the "heating area length $l_{54b}$") of, for example, about 210 mm. Each heater 54 has an outer diameter $\phi_{54}$ of, for example, about 6 mm. The two heaters 54 are arranged inside the core of the heating roller 53 so as not to contact the inner circumferential surface of the core. More specifically, there is a clearance of at least about 2 mm secured between the surface of each heater 54 and the inner circumferential surface of the core.

The reason why the two heaters 54 are used is to use heaters for different heating areas in accordance with the size of the print medium M. For example, to print on an A3-size medium, the heater 54 for the heating area length 14, of about 300 mm is used in order to heat the A3-size medium almost uniformly across the entire dimension of 297 mm in the short-side direction. Also, to print on an A4-size medium, the heater 54 for the heating area length $l_{54b}$ of about 210 mm is used in order to heat the A4-size medium almost uniformly across the entire dimension of 210 mm in the short-side direction. If the heater 54 for the heating area length of about 300 mm is used to print on the A4-size medium, the fusing belt 55 and the pressure roller 56 are unnecessarily heated to a high temperature in portions through which the print medium M does not pass. Therefore, in the fuser 5, the heaters 54 for the different heating area lengths $l_{54a}$ and $l_{54b}$ are used appropriately in accordance with the size of the print medium M, thereby preventing irrelevant portions from being unnecessarily heated to a high temperature. This eliminates the need to additionally provide the fuser 5 with a means for lowering the temperature of any portion that might be unnecessarily heated to a high temperature (e.g., a cooling fan) or the need to implement the process of suspending a print operation until the temperature falls. However, in the case where the image forming apparatus 1 has such a means for lowering the temperature or a capacity for performing such a process, the image forming apparatus 1 may be provided with only one heater 54 capable of dealing with all sizes for which the image forming apparatus 1 can print. In such a case, it is also possible to further reduce the outer diameter $\phi_{53}$ of the heating roller 53.

The fusing belt 55 is an endless belt with a backing material. The backing material includes, for example, polyimide (PI). The backing material has an inner diameter $\phi_{55}$ of, for example, 40 mm. Moreover, the backing material has a silicone rubber layer formed on its outer circumferential surface, and the silicone rubber layer has a thickness $t_{55a}$, which is approximately constant almost across its entirety in the direction of the center axis of the fusing belt 55. The thickness $t_{55a}$ is, for example, about 100 micrometers [μm].

The silicone rubber layer has a PFA layer formed on its circumferential surface, and the PFA layer has a thickness $t_{55b}$, which is approximately constant almost across its entirety in the direction of the center axis. The thickness $t_{55b}$ is, for example, about 12 μm.

The pressure roller 56 is in the form of a cylinder with a solid core. The core is made of, for example, a steel material such as STKM. The core has an outer diameter pas of, for example, about 27 mm. The core has a silicone rubber layer formed on its circumferential surface, and the silicone rubber layer has a thickness $t_{56a}$, which is approximately constant almost across its entirety in the direction of the center axis of the pressure roller 56. The thickness $t_{56a}$ is, for example, about 4 mm. The silicone rubber layer has a PFA layer formed on its circumferential surface, and the PFA layer has a thickness $t_{56b}$, which is approximately constant almost across its entirety in the direction of the center axis. The thickness $t_{56b}$ is, for example, about 30 μm.

The rollers 52 and 53 are disposed so as to be approximately parallel to the front-back direction of the image forming apparatus 1 (i.e., the Y-axis direction in FIG. 2) and spaced apart from each other at a predetermined distance. The fusing belt 55 is stretched between the rollers 52 and 53. Moreover, the heating roller 53 applies a tension of, for example, 50 newtons [N] to the fusing belt 55 in the stretching direction of the fusing belt 55.

The pressure roller 56 is similarly disposed so as to be approximately parallel to the Y-axis direction, and also press the fusing belt 55 wound on the fusing roller 52 against the fusing roller 52 so that a nip is formed in the feed path FP. Moreover, the pressure roller 56 applies a tension of, for example, about 400 N to the fusing belt 55. The nip has a width $w_{56}$ of, for example, about 8 mm in the feeding direction (i.e., the Z-axis direction in FIG. 2).

Furthermore, the motor M1, under control of the control unit 6, applies a rotational force to the pressure roller 56. Once the pressure roller 56 rotates, the fusing belt 55 rotates by being driven through a frictional force with the pressure roller 56. This rotation drives and rotates the rollers 52 and 53 as well. Moreover, the motor M1 generates a rotational force to such an extent that the print medium M delivered to the nip is conveyed at a rate of about 210 millimeters per second [mm/sec] in the Z-axis direction.

During a print operation, the control unit 6 executes on/off control of the heaters 54, while driving the motor M1. In the fuser 5, the print medium M with unfixed toner T is conveyed from the secondary transfer area to the nip. While passing through the nip, the print medium M is heated efficiently by the fusing belt 55 being heated by the heater 54, and is also pressed by the rollers 52 and 56. As a result, the toner T is fixed on the print medium M.

To render the fixing process fast and reliable, various creative features are provided, as described above. For example, the heating roller 53 has a core with high thermal conductivity and low heat capacity, and the inner circumferential surface of the core is painted in black. The heating roller 53 applies a necessary tension to the fusing belt 55, thereby increasing the contact area of the heating roller 53 and the fusing belt 55. As a result, heat from the heater 54 is conducted efficiently to the fusing belt 55. Moreover, the nip width $w_{56}$, which is as wide as about 8 mm, allows the heat to be conducted efficiently from the fusing belt 55 to the print medium M.

Furthermore, the fusing belt 55 has the thickness $t_{55}$ substantially across its entirety and therefore is extremely thin, so that the fusing belt 55 can be heated to a desired fusing temperature in a short time period of approximately 10 seconds. Reducing the time to be taken for raising the temperature shortens the period in which the heater 54 is kept on, which is advantageous from the viewpoint of energy saving.

Section 3: Details of Meandering Prevention Member

The fusing belt 55 receives a meandering force in the direction of the rotational axis of the heating roller 53, as is conventionally known, due to a variety of combined factors, such as deviations from parallelism of the rollers 52 and 53, deviations from parallelism of the rollers 52 and 56, circular runout of the rollers 52, 53, and 56, and variations of force applied to the nip. Conventionally, to prevent such meandering of the fusing belt 55, the heating roller 53 has meandering prevention members attached at opposite ends.

Furthermore, from the viewpoint of energy saving and cost advantage, the heating roller 53 preferably has a straight form. However, the fusing belt 55 is thin, as described earlier. Therefore, it is envisaged that if the inner diameter $\phi_{02}$ of the meandering prevention member and the inner diameter of the heating roller 53 are set to be equal, there might arise a problem where the fusing belt 55 is damaged or breaks by becoming stuck in a gap between the heating roller 53 and the meandering prevention member through meandering. Moreover, the fusing belt 55 might be damaged or break due to cyclic fatigue after becoming caught in such a gap repetitively, even if the fusing belt 55 is simply caught for a moment each time.

Figure 3:
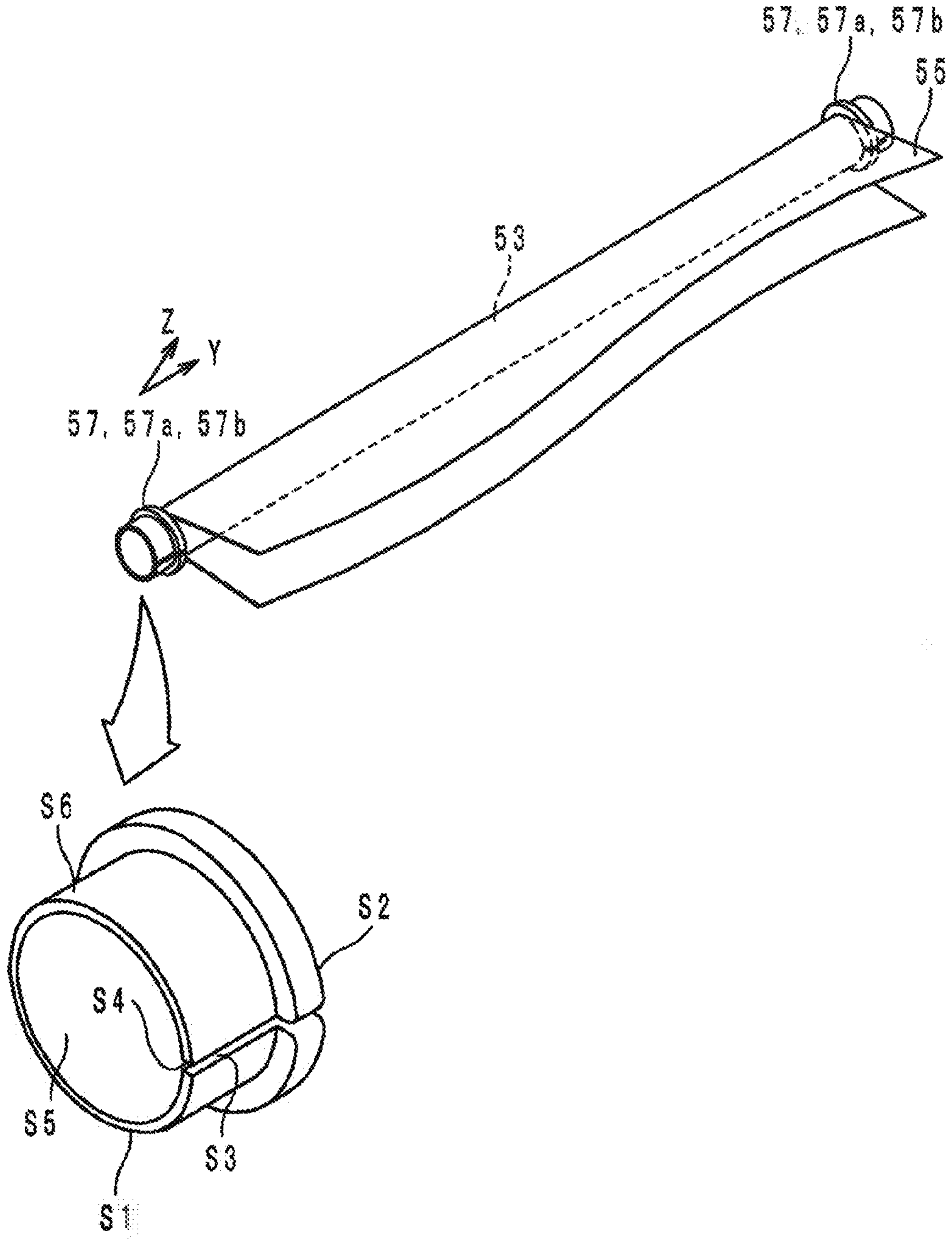
FIG. 3 is an oblique view illustrating a meandering prevention member according to an embodiment of the present invention, along with a heating roller.
Figure 4:
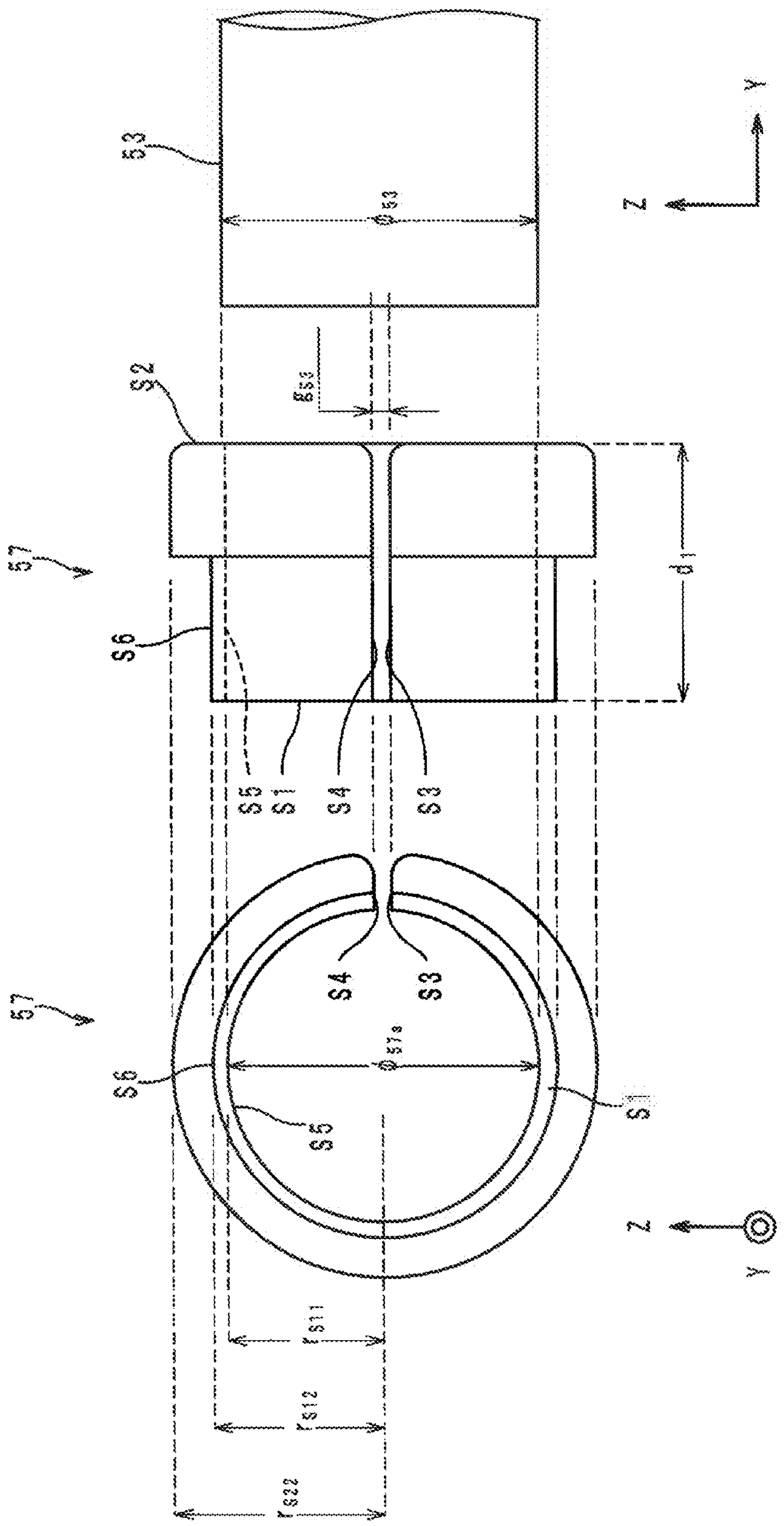
FIG. 4 is a view illustrating, on the left, the shape of the meandering prevention member in FIG. 3 as seen in the Y-axis direction, and also illustrating, on the right, the shape of the meandering prevention member as seen in a direction perpendicular to the Y- and Z-axes.

In view of the background described above, the heating roller 53 has meandering prevention members 57 attached at opposite ends, as shown in FIGS. 3 and 4. Here, FIG. 4 illustrates, on the left, a planar figure (i.e., a front view) of the meandering prevention member 57 as seen in the Y-axis direction, and also illustrates, on the right, a planar figure (i.e., a side view) of the meandering prevention member 57 and the heating roller 53 as seen in a direction perpendicular to the Y- and Z-axes. Each meandering prevention member 57 is made from a material with high thermal resistance (i.e., low thermal conductivity) and high thermostability. More specifically, the meandering prevention member 57 is made from a heat-resistant resin with low thermal conductivity compared to the material of the heating roller 53. Non-limiting examples of such a heat-resistant resin include polyphenylene sulfide (PPS), polyamide-imide (PAI), polyimide (PI), and liquid crystal polymer (LCP). Moreover, the meandering prevention member 57 generally has a partially annular shape, i.e., a C-like shape, when viewed in a plan view in the Y-axis direction. In the present embodiment, the surface of the meandering prevention member 57 (i.e., the interfacial surface with the external) includes a first end face S1, a second end face S2, a third end face S3, a fourth end face S4, an inner circumferential surface S5, and an outer circumferential surface S6.

The end faces S1 and S2 are opposite to each other at a distance $d_1$ in the Y-axis direction. When the meandering prevention member 57 is attached to the heating roller 53, the first end face S1 is positioned at the end of the heating roller 53, and the second end face S2 is positioned closer to the center of the heating roller 53.

Furthermore, the end face S1, when viewed in a plan view in the Y-axis direction, generally has a partially annular shape, i.e., a C-like shape, including a first arc with a radius $r_{S11}$ and a length $l_{S11}$ on its inner circumferential side and a second arc with a radius $r_{S12}$ (where $r_{S12}>r_{S11}$) and a length $l_{S12}$ (where $l_{S12}>l_{S11}$) on its outer circumferential side. Moreover, the arcs have central angles $\theta_{S11}$ and $\theta_{S12}$, respectively, of greater than 180°, preferably as close to 360° as possible. The end face S1 further includes a first segment connecting the arcs at one end and a second segment connecting the arcs at the other end. Each segment has a length $l_{S13}$, which is approximately ($l_{S12}-l_{S11}$).

Similar to the end face S1, the end face S2 has a partially annular shape, including a first arc with a radius $r_{S21}$ (where $r_{S21}=r_{S11}$) and a length $l_{S21}$ (where $l_{S21}=l_{S11}$) on its inner circumferential side and a second arc with a radius $r_{S22}$ (where $r_{S22}\geq r_{S21}$, and $r_{S22}\geq r_{S12}$) and a length $l_{S22}$ ($l_{S22}\geq l_{S21}$, and $l_{S22}\geq l_{S12}$) on its outer circumferential side. Moreover, the arcs have central angles $\theta_{S21}$ and $\theta_{S22}$, respectively, of at least greater than 180°, preferably as close to 360° as possible. In addition, the central angle $\theta_{S21}$ is substantially equal to the central angle $\theta_{S11}$. The end face S2 further includes a first segment connecting the arcs at one end and a second segment connecting the arcs at the other end. Each segment has a length $l_{S3}$, which is approximately ($l_{S22}-l_{S21}$).

Described next is the inner circumferential surface S5. The inner circumferential surface S5 is a surface which connects the first arcs of the end faces S1 and S2, and is in the shape of an arc with the radius $r_{S11}$ and the length $l_{S11}$ when viewed in a plan view in the Y-axis direction. Also, the outer circumferential surface S6 is a surface which connects the second arcs of the end faces S1 and S2, and is in the shape of an arc with the radius $r_{S12}$ and the length $l_{S12}$ when viewed in a plan view in the Y-axis direction.

The third end face S3 is a rectangular surface which connects the first segments of the end faces S1 and S2. The fourth end face S4 is a rectangular surface which connects the second segments of the end faces S1 and S2, and is approximately parallel to the third end face S3 with a gap $g_{S3}$. Moreover, to reduce the frequency of the fusing belt 55 becoming caught, the third end face S3 is connected to a portion of the outer circumferential surface S6 that is curved outwards when viewed in a plan view in the Y-axis direction. The same applies to the connection between the fourth end face S4 and the outer circumferential surface S6.

Furthermore, the inner diameter $\phi_{57a}$ of the meandering prevention member 57 is set to be equal to the diameter (i.e., $r_{S11}\times2$) of the inner circumferential surface S5. Accordingly, the inner diameter $\phi_{57a}$ is designed to be less than the outer diameter $\phi_{53}$ of the heating roller 53. More preferably, the inner diameter $\phi_{57a}$ is designed to be a value which satisfies $0.97\times\phi_{53}\leq\phi_{57a}\leq0.99\times\phi_{53}$. Moreover, the distance $d_1$ between the end faces S1 and S2 and the outer diameter $\phi_{57b}$ of the meandering prevention member 57 are designed appropriately such that the meandering prevention member 57 properly experiences elastic deformation during the assembly of the fuser 5.

Section 4: Actions and Effects of Meandering Prevention Member

As described above, the meandering prevention member 57 allows essentially no space as large as the fusing belt 55 might become stuck to be made between the heating roller 53 and the meandering prevention member 57. Accordingly, there is no need to provide any stepped portion at the end of the heating roller 53 through cutting work or raising. In other words, by using the meandering prevention member 57, it is rendered possible to employ, as the heating roller 53, a straight steel pipe at least whose outer diameter is small, more preferably, a straight steel pipe whose outer diameter is small and which is thin. As a result, the fuser 5 can be produced at low cost. Moreover, since such a straight steel pipe can be used as the heating roller 53, the volume of the heating roller 53 can be reduced. Thus, the heat capacity of the heating roller 53 can be decreased, which makes it possible to provide a fuser 5 which contributes to energy saving.

Furthermore, by determining the distance $d_1$, the inner diameter $\phi_{57a}$, and the outer diameter $\phi_{57b}$, as described above, it is rendered possible to, during the assembly of the fuser 5, allow the heating roller 53 to be inserted into the meandering prevention member 57 with the gap $g_{S3}$ defined by the end faces S3 and S4 being slightly widened, and thereafter, allow the meandering prevention member 57 to fasten the outer circumferential surface of the heating roller 53 with a strong force through elastic deformation. At this time, the gap $g_{S3}$ between the end faces S3 and S4 is slightly widened compared to the pre-attachment state (i.e., a natural state free of any applied force). Moreover, by using the meandering prevention member 57, an approximately uniform force acts on any portion of the heating roller 58 in the circumferential direction. Here, it was found from the Applicant's experimentation that, if such a force is 5 N or more, essentially no space is made between the outer circumferential surface of the heating roller 53 and the inner circumferential surface S5 of the meandering prevention member 57. The Applicant produced a prototype sample of the meandering prevention member 57 with the following specifications:

Material: PPS

Linear Expansion Coefficient: $3\times10^{-5}$/° C.

Inner Diameter $\phi_{57a}$: 18 mm

Outer Diameter $\phi_{57b}$: 20 mm

Distance $d_1$: 20 mm

Figure 5:
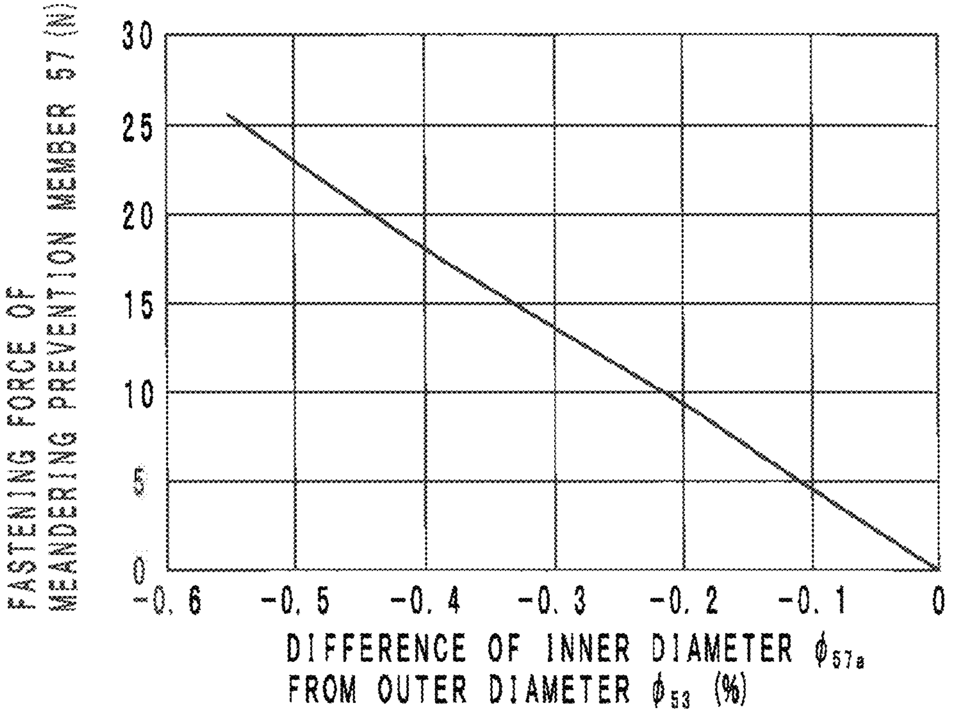
FIG. 5 is a graph showing the relationship of a fastening force of the meandering prevention member to the difference of inner diameter $\phi_{57a}$ from outer diameter $\phi_{53}$.

Furthermore, the Applicant measured the relationship of the fastening force of the meandering prevention member 57 to the difference of the inner diameter $\phi_{57a}$ of the sample of the meandering prevention member 57 from the outer diameter $\phi_{53}$ of the heating roller 53. The results are shown in FIG. 5. The measurement results shown in FIG. 5 indicate that, to ensure a fastening force of 5 N or more, it is necessary to set the inner diameter $\phi_{57a}$ to be less than the outer diameter $\phi_{53}$ by 0.1% or more. If the inner diameter $\phi_{57a}$ is designed such that $0.99\times\phi_{53}\leq\phi_{57}$, there is a possibility that because of the tolerance of the inner diameter $\phi_{57a}$, the inner diameter $\phi_{57a}$ might become greater than or equal to the outer diameter $\phi_{53}$, resulting in a reduced fastening force.

However, if the inner diameter $\phi_{57a}$ is set to be less than the outer diameter $\phi_{53}$ by 3%, a large force is required for widening the gap $g_{S3}$ in the meandering prevention member 57 during the assembly process. This renders the assembly difficult and also necessitates application of a large force to the meandering prevention member 57 to widen the gap gas, leading to a possibility that the meandering prevention member 57 might be damaged or break.

The result of using the meandering prevention member 57 as described above is that even if the fusing belt 55 walks to one side in the Y-axis direction, the fusing belt 55 properly rotates while rubbing the end face S2 of the meandering prevention member 57. In other words, the fusing belt 55 hits the end face S2 of the meandering prevention member 57, and is kept from moving beyond the position of the end face S2 in the Y-axis direction. Therefore, the fusing belt 55 is inhibited from coming into the space between the heating roller 53 and the meandering prevention member 57 and becoming caught therein, so that the fusing belt 55 becomes less likely to be damaged or break.

The fuser 5 operates within a high temperature range of from 100° C. to 200° C. during the print operation. At such high temperatures, the components of the fuser 5 experience thermal expansion. Here, unlike the heating roller 53, which is made of a steel material, the meandering prevention member 57 is made with a resin, and therefore, deforms significantly due to thermal expansion. Moreover, the meandering prevention member 57 at high temperature increases in size in the circumferential direction due to thermal expansion, and therefore, the gap $g_{S3}$ between the end faces S3 and S4 becomes narrower at high temperature than at normal temperature. Moreover, even at high temperature, it is preferable to allow essentially no space to be made between the heating roller 53 and the meandering prevention member 57. Accordingly, it is required to design the gap $g_{S3}$ so as to be kept at a size of zero or more even at high temperature. The reason for this is that if thermal expansion progresses even after the gap $g_{S3}$ is reduced to zero, there is created a force acting in the direction of increasing the inner diameter $\phi_{57a}$ of the meandering prevention member 57. This increases the possibility for a space as large as the fusing belt 55 might become stuck to be made between the heating roller 53 and the meandering prevention member 57.

Also consider the case where the meandering prevention member 57 is made with PPS whose linear expansion coefficient is $3\times10^{-5}$/° C., and has an inner diameter $\phi_{57a}$ of 18 mm. In this case, the circumferential length (i.e., the length $l_{S11}$) of the inner circumferential surface S5 is about 60 mm. If this meandering prevention member 57 is heated from normal temperature (about 20° C.) to 200° C., the meandering prevention member 57 thermally expands about 0.3 mm in the circumferential direction of the inner circumferential surface S5. Accordingly, it is necessary to design the gap $g_{S3}$ to be at least about 0.3 mm at normal temperature.

Section 5: First Modification

Figure 6:
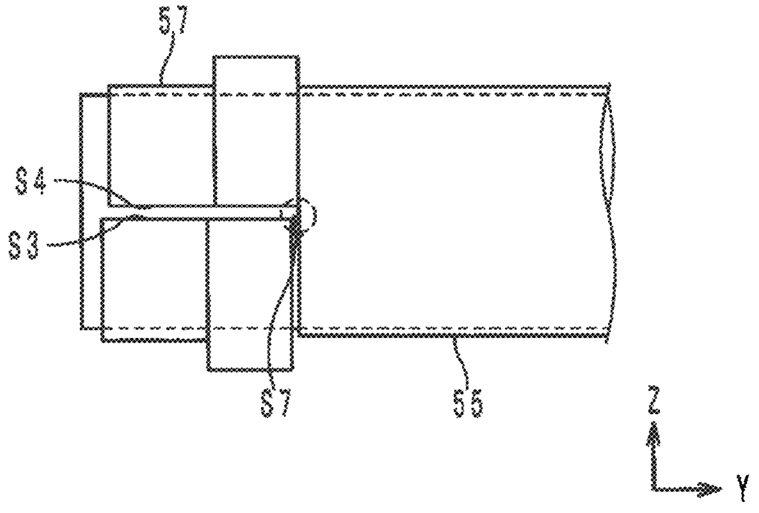
FIG. 6 is a view illustrating the meandering prevention member with a stepped portion which might occur.

In the meandering prevention member 57 according to the above embodiment, the end faces S3 and S4 are separated entirely by a space extending in the Y-axis direction. Accordingly, there is a possibility that the end faces S3 and S4 might deviate from each other in the Y-axis direction so as to be misaligned, resulting in a stepped portion S7, as shown in FIG. 6. It is envisaged that the fusing belt 55 becomes caught by the stepped portion S7 or rides thereon while the belt is rotating. If the fusing belt 55 in such a state keeps rotating, the fusing belt 55 might be stressed repeatedly and damaged or break.

Figure 7:
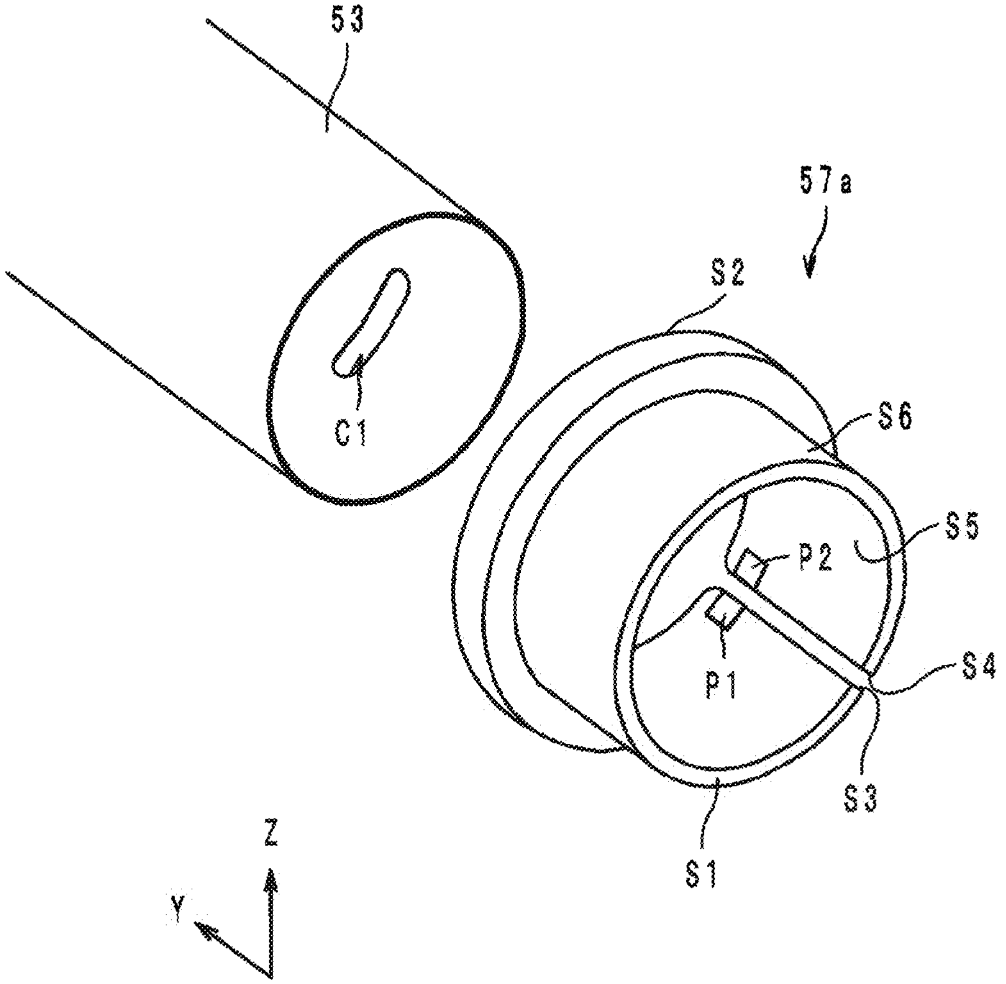
FIG. 7 is an oblique view illustrating a meandering prevention member according to a first modification, along with a heating roller.
Figure 8:
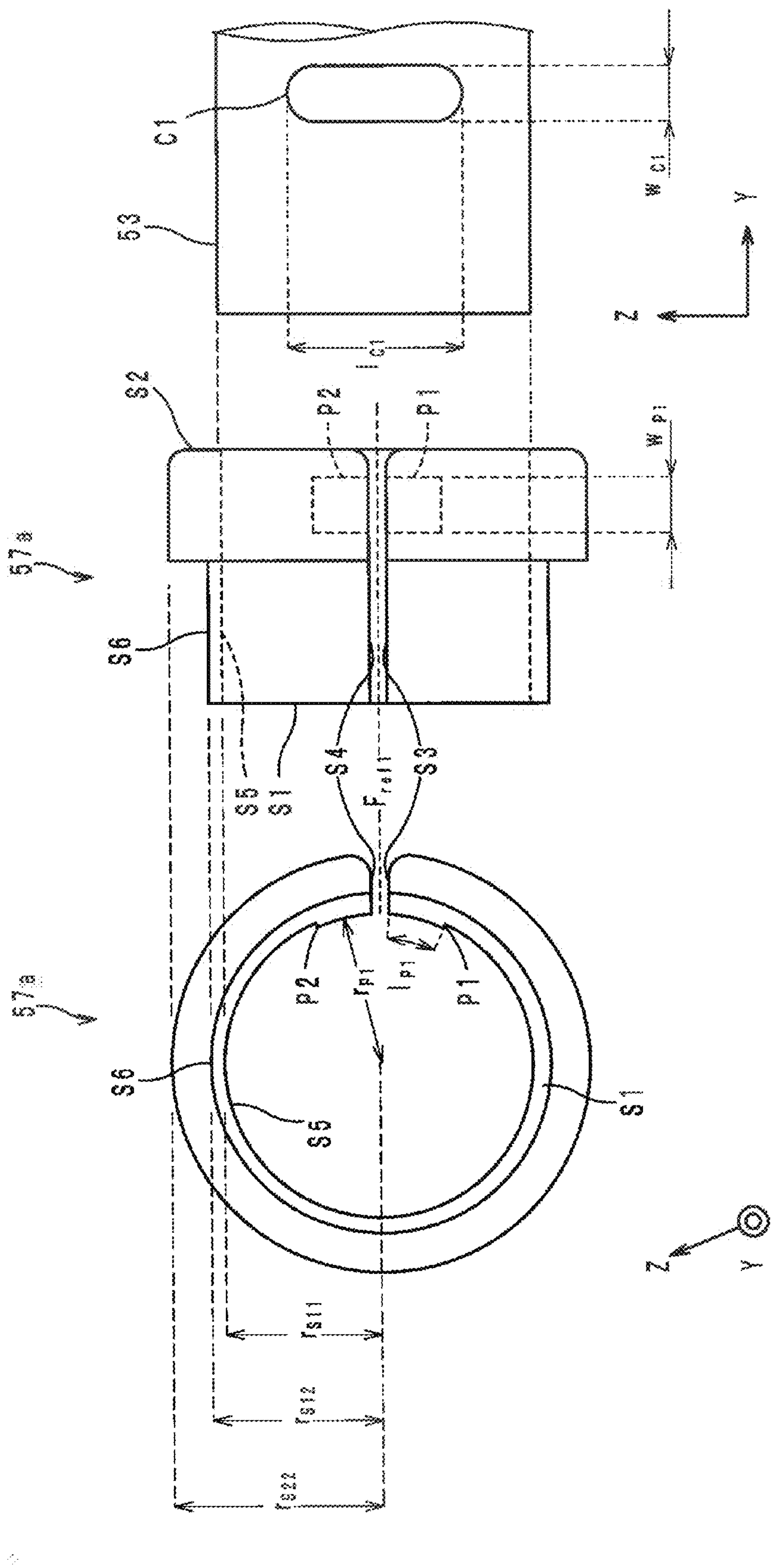
FIG. 8 is a view illustrating, on the left, the shape of the meandering prevention member in FIG. 7 as seen in the Y-axis direction, and also illustrating, on the right, the shape of the meandering prevention member as seen in a direction perpendicular to the Y- and Z-axes.

The occurrence of such a stepped portion S7 is prevented by a meandering prevention member 57*a* according to a first modification. To this end, in addition to the features of the meandering prevention member 57, the meandering prevention member 57*a* further includes a first protrusion P1, a second protrusion P2, and a first slit C1, as shown in FIGS. 7 and 8. There are no other differences between the meandering prevention members 57 and 57*a*. Accordingly, in FIGS. 7 and 8, elements corresponding to those shown in FIGS. 3 and 4 are denoted by the same reference characters, and any descriptions thereof will be omitted herein.

The first protrusion P1 and the second protrusion P2 are formed on the inner circumferential surface S5 near the third end face S3 and the fourth end face S4, so as to stick out toward the center axis of the inner circumferential surface S5. Moreover, it is preferable that the first protrusion P1 and the second protrusion P2 be formed so as to be slightly apart from the second end face S2.

More specifically, the first protrusion P1, when viewed in a plan view in the Y-axis direction, has a surface in the form of an arc having a radius $r_{P1}$ and a length $l_{P1}$ on the center axis side of the inner circumferential surface S5, as illustrated on the left in FIG. 8. Moreover, this arc-like surface has a constant width $w_{P1}$ parallel to the direction of the center axis. Here, the radius $r_{P1}$ is designed to be less than the radius $r_{S11}$ of each of the end faces S1 and S2 (i.e., the radius of the inner circumferential surface S5), and the length $l_{P1}$ is designed to be less than a half of the length $l_{S11}$. Furthermore, the width $w_{P1}$ is designed to be less than at least the distance $d_1$ between the end faces S1 and S2. Here, a first reference plane $F_{ref1}$ is defined as an imaginary plane passing exactly halfway between the end faces S3 and S4 in the natural state as described earlier. The second protrusion P2 has a shape approximately symmetrical to the first protrusion P1 with respect to the first reference plane $F_{ref1}$.

The first slit C1 is an example of a first engagement portion in which the protrusions P1 and P2 are fitted when the meandering prevention member 57*a* is attached to the heating roller 53. More specifically, the first slit C1 is provided in the heating roller 53 so as to be parallel to the end face S2 upon the attachment, and the slit C1 has a width $w_{C1}$ ($w_{C1}$=$w_{P1}$) in the direction of the center axis of the heating roller 53 and a length $l_{C1}$ in the circumferential direction of the heating roller 583. Here, the width $w_{C1}$ is approximately constant from one end to the other in the circumferential direction of the first slit C1.

When attaching the meandering prevention member 57*a* to the heating roller 53, it is necessary to widen the meandering prevention member 57*a*. Accordingly, the length $l_{C1}$ is designed to be greater than a distance along an arc extending from one end of the first protrusion P1 and passing through the other end of the first protrusion P1, the gap $g_{G3}$, and one end of the second protrusion P2, in this order, to the other end of the second protrusion P2 (i.e., the length of the arc in the rotational direction of the heating roller 53); more specifically, the length $l_{C1}$ is designed to be greater than $2\times l_{P1}+g_{S3}$. Moreover, with this designed value, it is possible to prevent the protrusions P1 and P2 from riding on the heating roller 53 and making a space between the meandering prevention member 57*a* and the heating roller 53.

Section 6: Actions and Effects of First Modification

In the first modification, the first protrusion P1 and the second protrusion P2, which are provided near the third end face S3 and the fourth end face S4, as well as the first slit C1, which is provided in the heating roller 53, cause the third end face S3 and the fourth end face S4 not to deviate from each other in the Y-axis direction and thereby not to be misaligned. Thus, the occurrence of the stepped portion S7 as mentioned earlier is prevented, thereby keeping the fusing belt 55 from being damaged or breaking.

Figure 9:
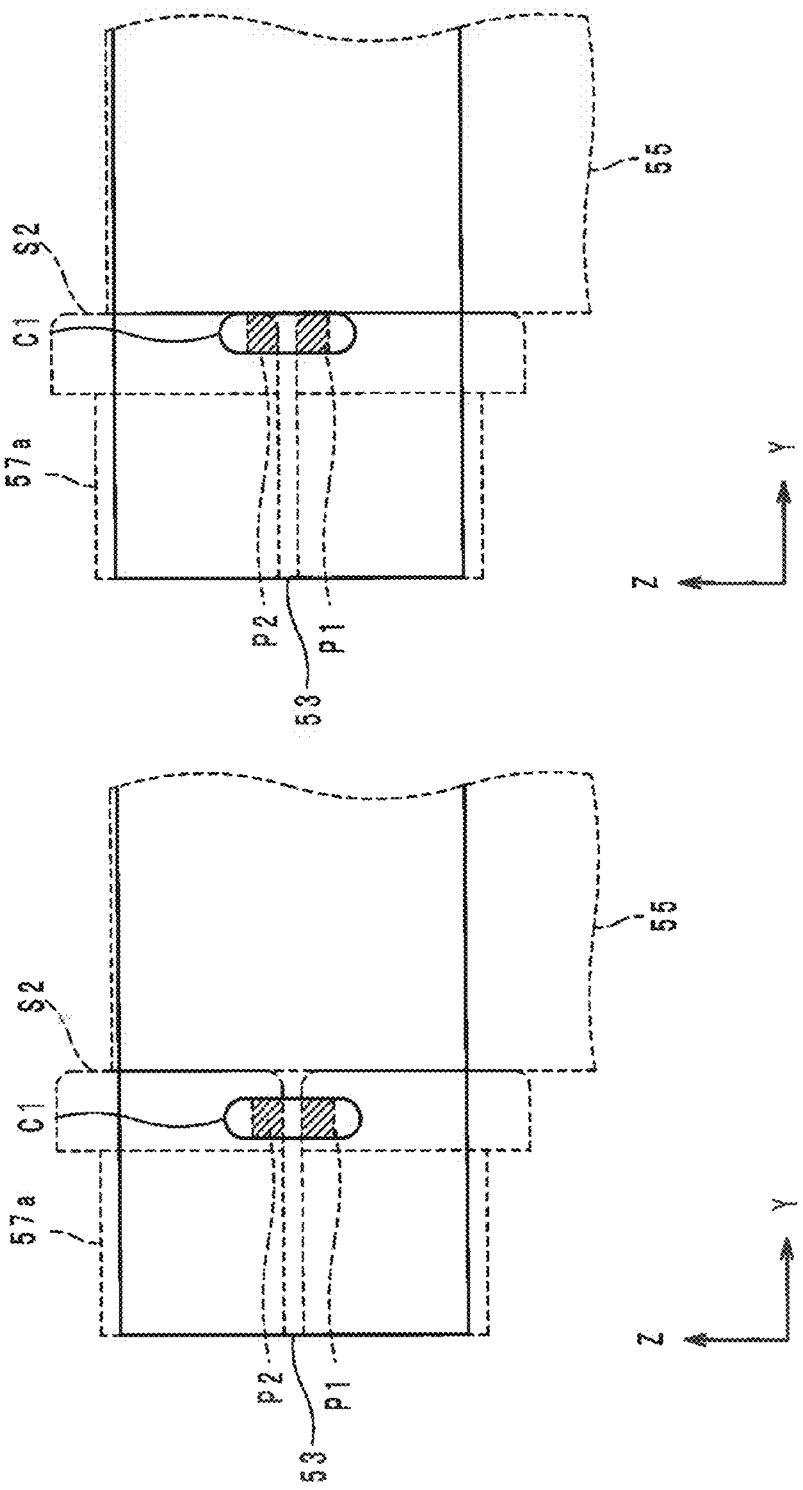
FIG. 9 is a view describing actions and effects of the meandering prevention member in FIG. 7.

Furthermore, the protrusions P1 and P2 are preferably formed slightly apart from the second end face S2 in the Y-axis direction, as described earlier. As a result, the fusing belt 55 does not contact the protrusions P1 and P2 while rotating, as shown on the left in FIG. 9, so that the fusing belt 55 becomes less likely to be caught by the meandering prevention member 57*a*. Thus, the fusing belt 55 can be prevented from being damaged or breaking. On the other hand, if the protrusions P1 and P2 are formed along the second end face S2, the protrusions P1 and P2 become more likely to contact the fusing belt 55 while the fusing belt 55 is rotating, as shown on the right in FIG. 9, so that the fusing belt 55 becomes more likely to be caught by the meandering prevention member 57*a*. In addition, the fusing belt 55 also becomes more likely to come into the first slit C1.

Section 7: Supplementary

In the first modification, the first slit C1 is exemplified as the first engagement portion. However, this is not limiting, and the first engagement portion may be a groove provided in the surface of the heating roller 53, so long as a steel pipe having a thickness tea of about 0.5 mm is used as the heating roller 53. However, it is preferable to use a steel pipe having a thickness $t_{53}$ of about 0.3 mm as the heating roller 53, as described earlier. In this case, if the first engagement portion is provided in the form of a groove (or a depression), the groove is as shallow as about 0.1 mm deep. As a result, the protrusions P1 and P2 are readily disengaged from such a groove. Therefore, the first slit C1, which is provided through the heating roller 53, is more preferable as the first engagement portion.

Furthermore, in the first modification, the protrusions P1 and P2 are fitted in the same first slit C1, so that the third end face 83 and the fourth end face S4 are aligned with each other with high accuracy. However, this is not limiting, and two slits (i.e., two first engagement portions) in which the protrusions P1 and P2 are fitted separately may be provided in the heating roller 53.

Furthermore, in the first modification, to render it less likely to cause the third end face S3 and the fourth end face S4 to deviate from each other in the Y-axis direction, the first protrusion P1 and the second protrusion P2 are preferably formed near the second end face S2, rather than near the first end face S1. However, this is not limiting, and the protrusions P1 and P2 may be formed near the first end face S1.

Section 8: Second Modification

In the meandering prevention member 57*a* according to the first modification, the first protrusion P1 and the second protrusion P2 are fitted in the same first slit C1, thereby ensuring to meet requirements, such as the parallelism of the third end face S3 and the fourth end face S4, with high accuracy. However, if the meandering prevention member 57*a* is originally slanted or twisted, in some cases, with the first protrusion P1, the second protrusion P2, and the first slit C1 alone, it might not be possible to ensure that the requirements, such as the parallelism of the third end face S3 and the fourth end face S4 are met with high accuracy.

Figure 10:
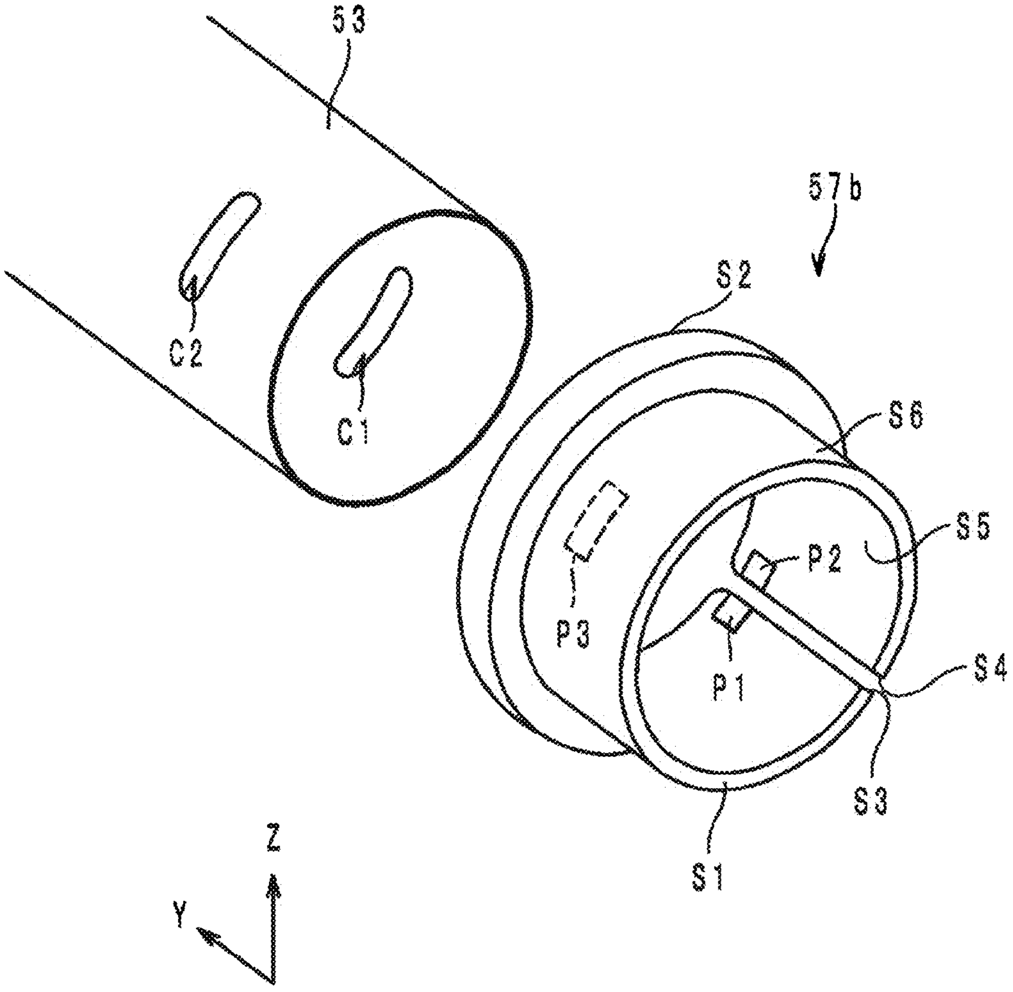
FIG. 10 is an oblique view illustrating a meandering prevention member according to a second modification, along with a heating roller.
Figure 11:
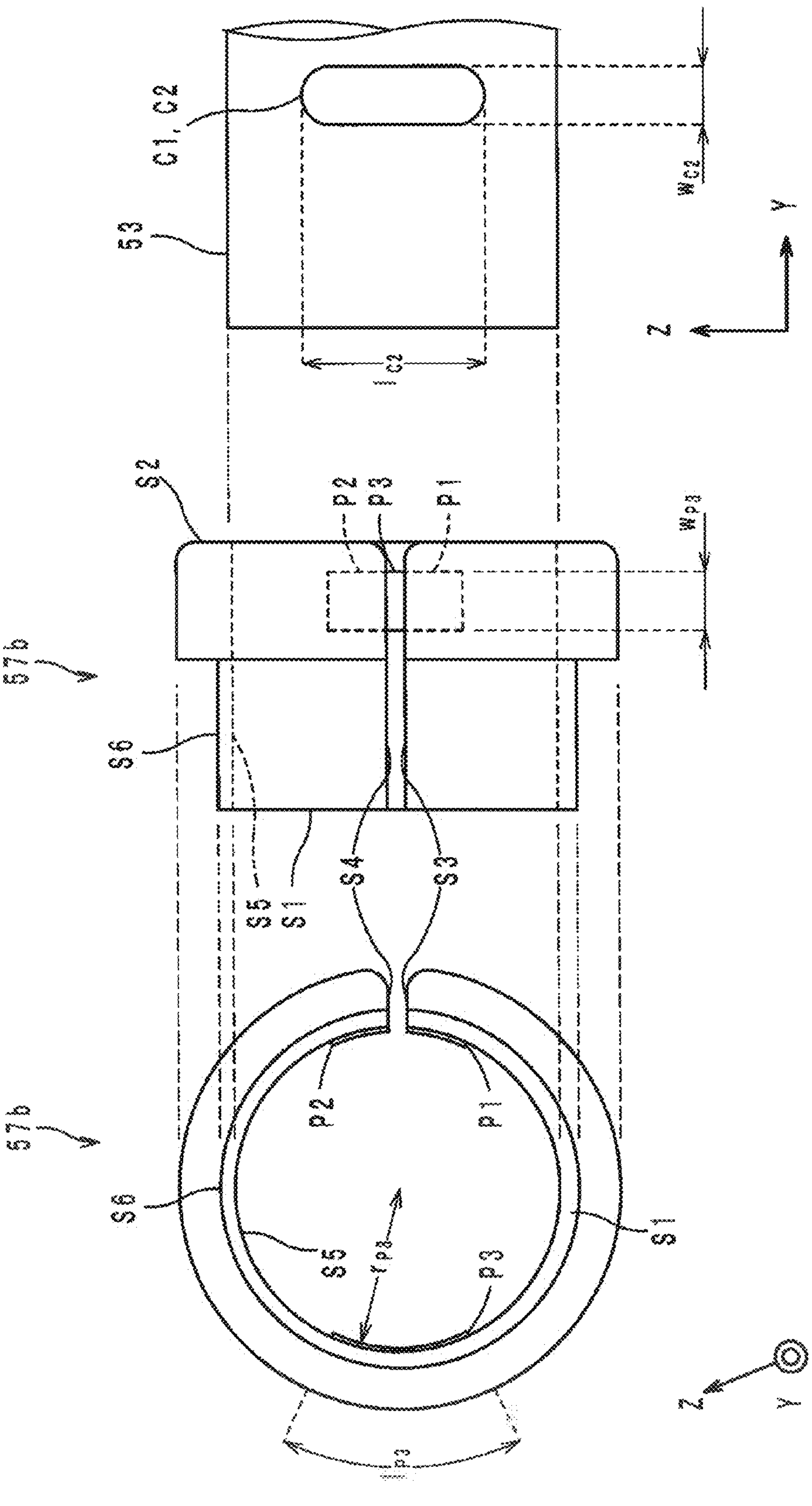
FIG. 11 is a view illustrating, on the left, the shape of the meandering prevention member in FIG. 10 as seen in the Y-axis direction, and illustrating, on the right, the shape of the meandering prevention member as seen in a direction perpendicular to the Y- and Z-axes.

In view of the foregoing, a meandering prevention member 57*b* according to a second modification is provided to ensure that the requirements, such as the parallelism of the third end face S3 and the fourth end face S4, are met with even higher accuracy. To this end, in addition to the features of the meandering prevention member 57*a*, the meandering prevention member 57*b* further includes a third protrusion P3 and a second slit C2, as shown in FIGS. 10 and 11. There are no other differences between the meandering prevention members 57*a* and 57*b*. Therefore, in FIGS. 10 and 11, elements corresponding to those shown in FIGS. 7 and 8 are denoted by the same reference characters, and any descriptions thereof will be omitted herein.

The third protrusion P3 is formed on the inner circumferential surface S5 in a position other than the positions where the protrusions P1 and P2 are formed, so as to stick out toward the center axis of the inner circumferential surface S5. More preferably, the third protrusion P3, when viewed in a plan view in the Y-axis direction, is positioned so as to be opposed to the protrusions P1 and P2 with respect to the center axis of the inner circumferential surface S5.

More specifically, the third protrusion P3, when viewed in a plan view in the Y-axis direction, has a surface in the form of an arc having a radius $r_{P3}$ and a length $l_{P3}$ on the center axis side of the inner circumferential surface S5, as illustrated on the left in FIG. 11. Moreover, this arc-like surface has a width $w_{P3}$ along the direction of the center axis, and the width $w_{P3}$ is approximately constant in the circumferential direction of the inner circumferential surface S5. Here, the radius $r_{P3}$ is designed to be less than the radius $r_{S11}$ of the inner circumferential surface S5. Also, the length $l_{P3}$ and the width $w_{P3}$ are determined appropriately considering the size of the meandering prevention member 57*b* and other factors.

The second slit C2 is an example of a second engagement portion in which the third protrusion P3 is fitted when the meandering prevention member 57*b* is attached. More specifically, the second slit C2 is provided in the heating roller 53 so as to be parallel to the end face S2 upon the attachment. The second slit C2 has a width $w_{C2}$ ($w_{C2}=w_{P3}$) in the direction along the center axis of the heating roller 53, and a length $l_{C2}$ in the direction along the circumference of the heating roller 53. Here, the width $w_{C2}$ is approximately constant from one end to the other in the circumferential direction of the second slit C2.

Section 9: Actions and Effects of Second Modification

In the second modification, the first protrusion P1 and the second protrusion P2 are fitted in the first slit C1, and further, the third protrusion P3 is fitted in the second slit C2. Here, the width $w_{P1}$ of each of the protrusions P1 and P2 is essentially equal to the width $w_{C1}$ of the first slit C1, and the width $w_{P3}$ of the third protrusion P3 is essentially equal to the width $w_{C2}$ of the second slit C2. Accordingly, when the meandering prevention member 57*b* is attached, the original slant and twist of the meandering prevention member 57*b* are corrected such that the requirements, including the parallelism of the third end face S3 and the fourth end face S4, are met in accordance with design criteria.

Section 10: Supplementary

In the second modification, as in the first modification, the second engagement portion may be a groove provided in the surface of the heating roller 53.

Furthermore, in the second modification, as in the first modification, the third protrusion P3 is preferably formed near the second end face S2.

Section 11: Third Modification

The heating roller 53 is heated to a high temperature at opposite ends. In the case where the heating roller 53 is supported by bearings at opposite ends, to inhibit the bearings from being heated to an excessively high temperature, heat insulating bushings made from a resin material or suchlike which has a higher thermal resistance than steel materials are conventionally interposed between the heating roller 53 and the bearings.

If the bearings and the heating roller 53 are in direct contact, the bearings are heated to a high temperature, which promotes deterioration of grease packed in the bearings. This increases friction between the inner and outer races of the bearings, so that the inner races become less slippery. As a result, the heating roller 53 slides and rubs the surfaces of the bearing inner races, and therefore, is deformed by wear.

Figure 12:
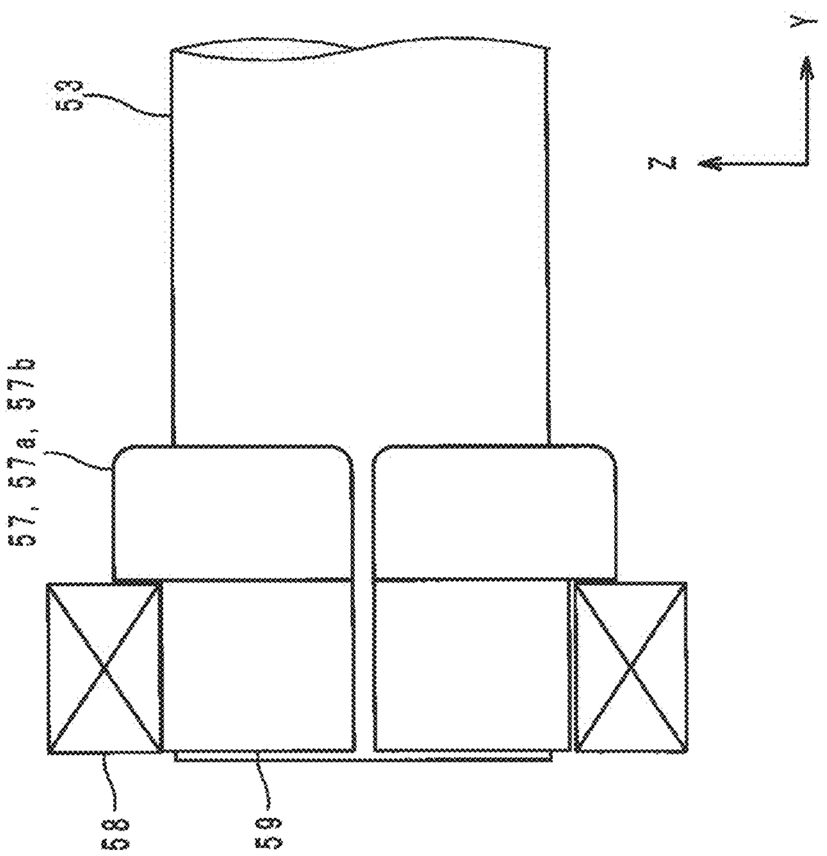
FIG. 12 is a view illustrating a meandering prevention member according to a third modification.

The heat insulating bushings provided in view of the foregoing have a shape similar to the meandering prevention members 57, 57*a*, and 57*b*, as is well-known. Accordingly, from the viewpoint of, for example, reducing the number of components, it is preferable that the heat insulating bushing 59 that is to be provided between the bearing 58 and the heating roller 583 be integrated with the meandering prevention member 57, 57*a*, or 57*b*, as shown in FIG. 12.

Section 12: Supplementary

The above embodiments, first modification, second modification, and third modification have been described with respect to the case where the belt-drive device 51 is used for the fuser 5. However, this is not limiting, and the belt-drive device 51 can also be applied to devices other than the fuser 5.

Although the present invention has been described in connection with the preferred embodiment above, it is to be noted that various changes and modifications are possible to those who are skilled in the art. Such changes and modifications are to be understood as being within the scope of the invention.

What is claimed is:

1. A belt-drive device comprising:

a roller rotatable about an axis;

a belt wound on an outer circumferential surface of the roller; and a meandering prevention member attached to an end of the roller and abutting a side of the belt in the direction of the axis, wherein, the meandering prevention member is elastically deformable and has an annular shape, and the meandering prevention member has an inner circumferential surface whose diameter is less than an outer diameter of the roller before the meandering prevention member is attached to the roller;

wherein the meandering prevention member includes:

a first end face and a second end face being opposite to each other in the direction of the axis and connected by the inner circumferential surface;

a third end face connected to the first end face, the second end face, and the inner circumferential surface; and a fourth end face connected to the first end face, the second end face, and the inner circumferential surface, and having a gap from the third end face, and the gap is wider after the attachment to the roller;

wherein, the meandering prevention member further includes a first protrusion and a second protrusion provided on the inner circumferential surface near the third end face and the fourth end face, and the roller includes a first engagement portion in which both the first protrusion and the second protrusion are fitted.

2. The belt-drive device according to claim 1, wherein the diameter of the inner circumferential surface is greater than or equal to 97% but less than or equal to 99.9% of the outer diameter of the roller before the attachment to the roller.

3. The belt-drive device according to claim 1, wherein the roller is made with a straight steel pipe material.

4. The belt-drive device according to claim 1, wherein the gap is zero or more even when the meandering prevention member is heated after the attachment.

5. The belt-drive device according to claim 1, wherein, the meandering prevention member further includes a third protrusion provided on the inner circumferential surface in a different position from the first protrusion and the second protrusion, and the roller further includes a second engagement portion in which the third protrusion is fitted.

6. The belt-drive device according to claim 1, wherein the first engagement portion is an opening provided through the roller.

7. The belt-drive device according to claim 1, wherein the first engagement portion has a length in a rotational direction of the roller greater than a combined length extending from one end of the first protrusion, through the other end of the first protrusion, the gap, and one end of the second protrusion, to the other end of the second protrusion in the rotational direction of the roller.

8. The belt-drive device according to claim 1, wherein the first protrusion and the second protrusion are formed apart from one of the first end face and the second end face that is positioned closer to the center in the direction of the axis upon the attachment to the roller.

9. An electrophotographic image forming apparatus comprising a fuser provided with a belt-drive device of claim 1.

10. A belt-drive device comprising:

a roller rotatable about an axis;

a belt wound on an outer circumferential surface of the roller; and a meandering prevention member attached to an end of the roller and abutting a side of the belt in the direction of the axis, wherein, the meandering prevention member is elastically deformable and has an annular shape, and the meandering prevention member has an inner circumferential surface whose diameter is less than an outer diameter of the roller before the meandering prevention member is attached to the roller;

wherein the meandering prevention member includes:

a first end face and a second end face being opposite to each other in the direction of the axis and connected by the inner circumferential surface;

a third end face connected to the first end face, the second end face, and the inner circumferential surface; and a fourth end face connected to the first end face, the second end face, and the inner circumferential surface, and having a gap from the third end face, and the gap is wider after the attachment to the roller;

wherein, the meandering prevention member further includes a first protrusion and a second protrusion provided on the inner circumferential surface near the third end face and the fourth end face, and the roller further includes two first engagement portions in which the first protrusion and the second protrusion are fitted separately.

11. A belt-drive device comprising:

a roller rotatable about an axis;

a belt wound on an outer circumferential surface of the roller; and a meandering prevention member attached to an end of the roller and abutting a side of the belt in the direction of the axis, wherein the meandering prevention member is elastically deformable and has an annular shape, the meandering prevention member has an inner circumferential surface whose diameter is less than an outer diameter of the roller before the meandering prevention member is attached to the roller, and the inner circumferential surface of the meandering prevention member is disposed on the outer circumferential surface of the end of the roller at a position where the outer diameter of the roller is equal to the outer diameter of the roller where the belt is wound.

* * * * *